United States Patent [19]

Matsumoto

[11] Patent Number: 4,770,221
[45] Date of Patent: Sep. 13, 1988

[54] HEAVY DUTY PNEUMATIC RADIAL TIRE

[75] Inventor: Kenji Matsumoto, Musashimurayama, Japan

[73] Assignee: Bridgestone Corporation, Tokyo, Japan

[21] Appl. No.: 939,982

[22] Filed: Dec. 10, 1986

[30] Foreign Application Priority Data

Dec. 27, 1985 [JP] Japan .................. 60-293029

[51] Int. Cl.$^4$ ............................. B60C 9/08
[52] U.S. Cl. .................. 152/554; 152/546; 152/548
[58] Field of Search ............ 152/554, 552, 560, 543, 152/548, 546, 542, 454, 541

[56] References Cited

U.S. PATENT DOCUMENTS

| | | | |
|---|---|---|---|
| 3,760,858 | 9/1973 | Grossett | 152/554 X |
| 4,046,183 | 9/1977 | Takahashi et al. | 152/543 X |
| 4,086,948 | 5/1978 | Suzuki et al. | 152/554 X |
| 4,319,621 | 3/1982 | Motomura et al. | 152/554 X |
| 4,352,383 | 10/1982 | Matsumoto et al. | 152/454 |

*Primary Examiner*—Michael Ball
*Assistant Examiner*—Ramon R. Hoch
*Attorney, Agent, or Firm*—Sughrue, Mion, Zinn, Macpeak & Seas

[57] ABSTRACT

A heavy duty pneumatic radial tire is disclosed, having bead portions with an improved durability. The tire is provided with a carcass of at least one ply, including a carcass body extending between both bead portions of the tire, and turn-up portions which are contiguous with the carcass body and arranged around and radially outwardly of bead wires. In a particular radial region of the tire, the distance G between center lines of the carcass body and the turn-up portion of the carcass is optimized in accordance with relevant dimensional parameters of the tire, to minimize strains and suppress separations in the bead portions.

4 Claims, 3 Drawing Sheets

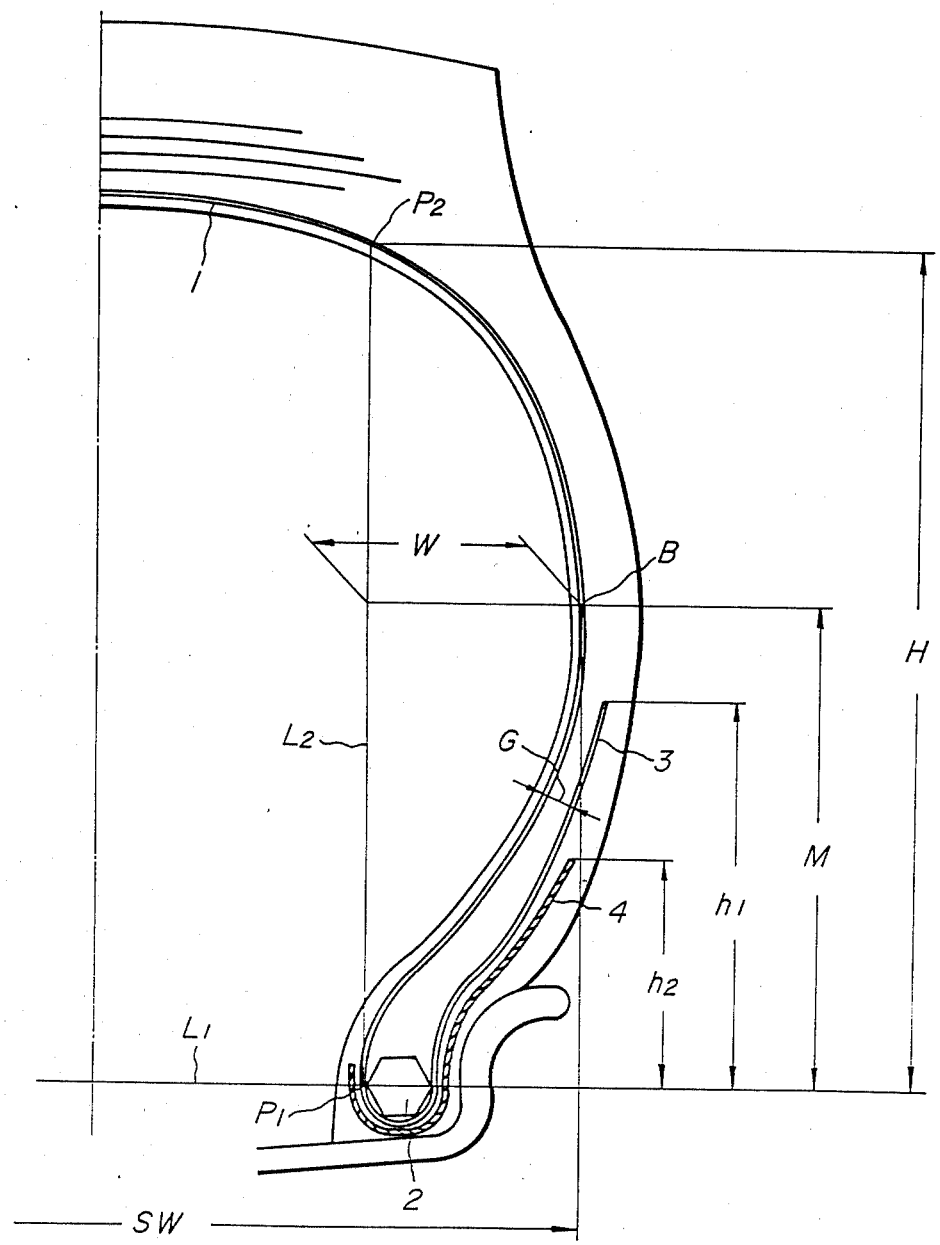
FIG_1

FIG_2A
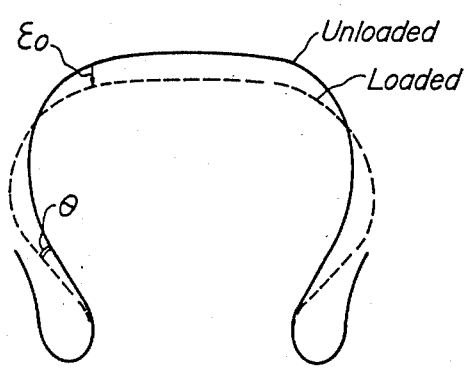
FIG_2B
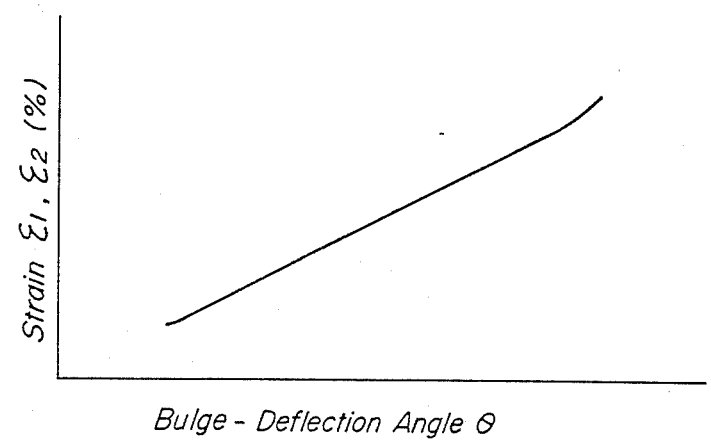

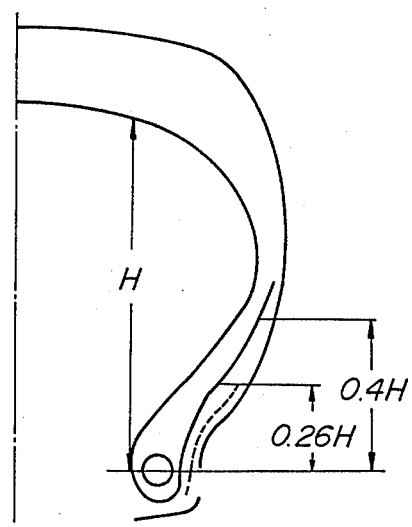
FIG_2C
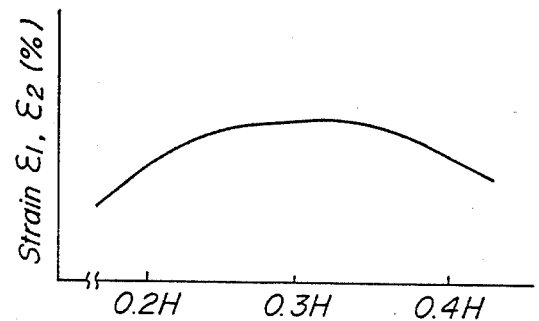
FIG_2D
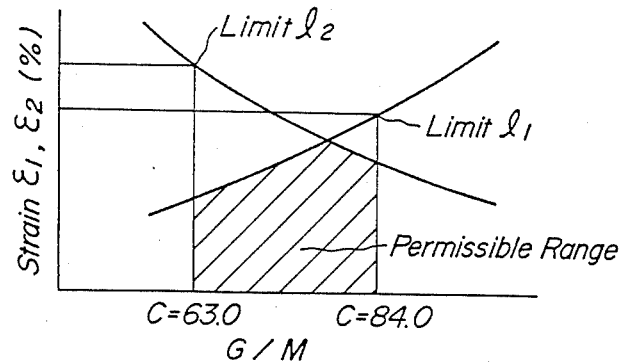
FIG_2E

HEAVY DUTY PNEUMATIC RADIAL TIRE

BACKGROUND OF THE INVENTION

1. Field of the Invention

The present invention relates to a pneumatic radial tire; more particularly, it pertains to a heavy duty radial tire having bead portions with improved durability, which may be used on rough roads.

2. Description of the Related Art

In conventional heavy duty pneumatic radial tires for use on rough roads, separation of the carcass from its surrounding rubber material often occurs near the turn-up end of the carcass in the bead portion, and is recognized to be an important and serious problem. Hence, for such a radial tire, it is known to realize a bead portion with a desired rigidity, by arranging therein a carcass of at least one ply of steel cords oriented substantially at 90° to the circumferential direction of the tire, such that the carcass extends about a bead core from an axially inner side to outer side thereof. A reinforcing layer in the form of a steel cord chafer is arranged on axially outer side of the turn-up portion of the carcass which, in turn, is arranged on the axially outer side of the bead core. Furthermore, a rubber stiffener stock is arranged between the turn-up portion of the carcass and the carcass body, i.e. that portion of the carcass which is on the axially inner side of the bead core.

When, however, radial tires are used on a rough road under a heavy load condition, side walls of the tire are subjected to a severe deflective deformation due to impact forces applied particularly when the tires ride over stones. It has been found that, during such a deformation, the durability of the bead portions is adversely affected by discontinuous location in terms of rigidity, which exists between the side wall with flexibility and bead portion with rigidity. That is, undesirable separation tends to occur at the turn-up end of the carcass or at the radially outer end of the steel cord chafer, both situated near the above-mentioned discontinuous location.

Various proposals have been made heretofore, in an effort to mitigate the occurrence of separation, including additional provision of textile chafer on the outer side of the steel cord chafer, modification in rubber material arranged near the radially outer end of the carcass turn-up portion or of the steel cord chafer, and the introduction of a stiffener in which flexible rubber and rigid rubber are combined. Still, however, none of these attempts proved to achieve a sufficient solution.

SUMMARY OF THE INVENTION

Accordingly, it is an object of the present invention to provide a heavy duty pneumatic radial tire for use on rough roads, with an improved durability of the bead portions, which may be achieved in a convenient manner, without physically increasing the number of chafers, or without modification in materials.

Briefly stated, the present invention is based on a novel recognition obtained through a comprehensive study that, in suppressing shearing and/or compressive strain in the bead portion, the distance between the center lines of the carcass body and the carcass turn-up portion plays an important role as a dominant parameter, and that it is thus necessary to appropriately determine the above-mentioned distance in accordance with various tire configurations.

BRIEF DESCRIPTION OF THE DRAWINGS

FIG. 1 is a cross-sectional view showing one half of the pneumatic radial tire in accordance with a preferred embodiment of the present invention;

FIG. 2A is an explanatory view showing the variation in shape of the carcass and the bulge-deflection angle $\theta$ thereof, under the normally inflated and loaded condition of the tire;

FIG. 2B is a diagram showing the relationship between the bulge-deflection angle $\theta$ and the strains $\epsilon_1$, $\epsilon_2$ at the radially outer ends of the carcass and chafer;

FIG. 2C is an explanatory view showing the radial region of the bead portion in which is to be determined the distance between the center lines of the carcass body and the turn-up portion;

FIG. 2D is a diagram showing the strain characteristic in the above-mentioned radial region of the bead portion; and FIG. 2E is a diagram showing the relation between coefficient C and strains $\epsilon_1$, $\epsilon_2$.

DETAILED DESCRIPTION OF THE INVENTION

The present invention will now be more fully explained with reference to the accompanying drawings. There is shown in FIG. 1 a pneumatic radial tire in accordance with a preferred embodiment of the present invention. The radial tire illustrated herein includes a carcass of at least one ply, which consists of steel cord layers. The carcass includes a carcass body 1 arranged to extend between both head portions of the tire, in which are embedded bead wires 2. The carcass further includes a pair of turn-up portions 3 which are contiguous with the carcass body 1 and extend about the bead wires 2. The distal ends of the turn-up portions 3 extend radially outwardly of the bead wire 2. Furthermore, at least one pair of chafers 4 consisting of steel cord layers are arranged in the bead portions on axially outerside of the carcass turn-up portions 3.

The radial tire of the present invention, including the above-mentioned elements, features a specific geometrical determination of the dimensions of elements, to be more particularly described hereinafter. The bead wire 2 has a center line which is intersected by a first line $L_1$ extending in parallel with the rotational axis of the tire, the first line being the reference line in respect of radial dimensions. This first line $L_1$ intersects the carcass body 1 at a first point $P_1$. A second line $L_2$ extends radially and perpendicularly to the first line $L_1$, as the reference line in respect of axial dimensions, and passes the first point $P_1$. The second line $L_2$ intersects the carcass body 1 at a second point $P_2$. The second point $P_2$ is spaced a distance H from the first point $P_1$. The carcass body 1 has a maximum width point B which is spaced a radial distance M from the axially extending first line $L_1$, and an axial distance W from the radially extending second line $L_2$. The center lines of the carcass body 1 and the carcass turn-up portion 3 are spaced a distance G from each other, in a radially outer region within the range of $(0.26 \sim 0.40)H$ with respect to the first line $L_1$. Furthermore, the turn-up end of the carcass is spaced a distance $h_1$ from the first line $L_1$. According to the present invention, these parameters are determined to satisfy, in normal inflated and unloaded condition of the tire, the following condition (1):

$$h_1 > 0.4H \tag{1}$$

Furthermore, the distance G between the center lines of the carcass body 1 and the turn-up portion 3 of the carcass is determined, in a radially outer region within the range of (0.26~0.40)H with respect to the first line $L_1$, to satisfy the following condition (2):

$$G = M \times 10^{-3} \times (C - 191\theta) \quad (2)$$

wherein

C is a coefficient within a range of 63.0 to 84.0, and $\theta$ is an angle in terms of radian defined by $$\theta = \tan^{-1}\frac{M}{W} - \tan^{-1}\frac{1}{\sqrt{\frac{3.03(W^2 + M^2)}{(2M - 0.243H)^2} - 1}}$$

According to the inventor's observation, separation near the carcass turn-up end of the steel cord carcass, or near the radially outer end of the steel cord chafer occurs mainly due to excessive compressive and shearing stresses applied to such ends during the rolling motion of the tire. Furthermore, strains corresponding to these stresses depend upon the bulge-deflection angle $\theta$ with which the carcass body 1 in the bead portion of the tire deforms as illustrated in FIG. 2A, from the configuration corresponding to the normal inflated and unloaded condition of the tire, shown by the solid line, into the configuration corresponding to the normal inflated and normal loaded condition of the tire, shown by the broken line. The relationship between the strains $\epsilon_1$, $\epsilon_2$ of the carcass turn-up end and radially outer end of the chafer 4, and the bulge-deflection angle $\theta$ is substantially as shown in FIG. 2B, from which it can be concluded that the strains $\epsilon_1$, $\epsilon_2$ can be minimized by suppressing the bulge-deflection angle $\theta$ of the carcass body at the bead portions of the tire. On the other hand, as an experiential recognition, it is known that the vertical or radial strain $\epsilon_0$ of the carcass body as a whole assumes in many cases a value in the neighbourhood of $\epsilon_0/H = 0.13$. Thus, in order to more precisely clarify the relationship between the bulge-deflection angle $\theta$ of the carcass body and the strains $\epsilon_1$, $\epsilon_2$ the inventor has made an expedient assumption of the vertical strain $\epsilon_0$ to be $\epsilon_0/H = 0.13$. Furthermore, in order to make it possible to geometrically determine the rough value of the bulge-deflection angle $\theta$ in the neighbourhood of $\epsilon_0/H = 0.13$, the carcass configuration has been approximated by two straight lines $\overline{P_1B}$ and $\overline{BP_2}$, of which the line $\overline{P_1B}$ passes the above-mentioned first point $P_1$ and the maximum width point B of the carcass body, and the line $\overline{BP_2}$ passes the maximum width point B and the above-mentioned second point $P_2$. The inventor has conceived that the strains $\epsilon_1$, $\epsilon_2$ can effectively be suppressed by appropriately determining the distance G between the center lines of the carcass body and the turn-up portion of the carcass, in accordance with the value of the bulge-deflection angle $\theta$ assumed as above. Such a concept ultimately resulted in conditions (1) and (2) explained hereinbefore, which the tire of the present invention has to suffice.

According to the present invention, as shown in FIG. 2C, the distance G between the center lines of the carcass body 1 and the turn-up portion 3 of the carcass is determined particularly in a radially outer region within the range of (0.26~0.40)H with respect to the axially extending first line $L_1$. This is based on a recognition that the strains $\epsilon_1$, $\epsilon_2$ at the carcass turn-up portion 3 and the radially outer end of the chafer 4 are dependent mainly upon rigidity in that particular region. Such a recognition has been gained after observation of the variation in the strains $\epsilon_1$, $\epsilon_2$ within the region in question, as shown in FIG. 2D.

According to the present invention, furthermore, the condition (2) for determining the distance G between the center lines of the carcass body 1 and the turn-up portion 3 of the carcass includes a coefficient C which is within the range of 63.0 to 84.0. It has been experimentally ascertained that, as shown in FIG. 2E, an excessively large distance G results in an increase in the strain $\epsilon_1$ at the carcass turn-up end, beyond a permissible upper limit $l_1$, while an excessively small distance G results in an increase in the strain $\epsilon_2$ at the radially outer end of the chafer, beyond a permissible upper limit $\phi_2$. These strains $\epsilon_1$, $\epsilon_2$ can be accommodated within a permissible range when the coefficient C is determined to be within the above-mentioned numerical range.

On the other hand, the distance $h_1$ with which the turn-up end of the carcass is spaced from the axially extending first line $L_1$ is determined, in accordance with the present invention, to be more than 0.4 times the distance H between the first point $P_1$ and the second point $P_2$ on the carcass body 1. This is due to the recognition that, in case of large scale radial tires for construction purposes, etc., the turn-up end of the carcass should be situated outside of regions having excessive strain. Moreover the relationship $h_1 > 0.4H$ is considered appropriate in realizing an improved side-cut resistance of heavy duty radial tires, since cracks growing from the outer surface of the tire side wall into the rubber material thereof can effectively be interrupted at the carcass turn-up portion 3.

Referring back to FIG. 1, the embodiment shown therein corresponds to one application of the present invention to a pneumatic radial tire of the size 18.00 R 25 with the basic structure as mentioned above. The tire of this embodiment includes a carcass of a single ply consisting of steel cord layers, which is arranged in the bead portion of the tire to extend around the bead wire 2 from the axially inner side to the axially outer side thereof. A chafer 4 consists of steel cords, which are oriented at 30° with respect to the circumferential direction of the tire, and is arranged on axially outer side of each turn-up portion 3 of the carcass. In this embodiment, a radial distance H is formed between the first point $P_1$ on the carcass body 1, intersected by the first line $L_1$ which extends in parallel with the rotational axis of the tire and which passes the center line of the bead wire 2, and the second point $P_2$ on the carcass body 1, intersected by the second line $L_2$ which extends perpendicularly to the first line $L_1$, this radial distance H being 376 mm. From the first line $L_1$, the carcass turn-up end is spaced a radial distance $h_1$ of 215 mm, and the radially outer end of the chafer is spaced a radial distance $h_2$ of 65 mm.

The maximum width point B of the carcass body 1 is spaced a radial distance M of 210 mm from the first line $L_1$, and an axial distance W of 107 mm from the second line $L_2$. In the axially outer region within the range of 28~150 mm ([0.26~0.40]H) with reference to the first line $L_1$, the distance G between the center lines of the carcass body 1 and the turn-up portion 3 of the carcass is determined to be within 7.1~10.0 mm. In this case, the bulge-deflection angle $\theta$ is as follows:

$$\theta = \tan^{-1}\frac{M}{W} - \tan^{-1}\frac{1}{\sqrt{\frac{3.03(W^2 + M^2)}{(2M - 0.243H)^2} - 1}} =$$

0.170(radian)

Furthermore, the coefficient C in the above mentioned condition (2) is as follows:

$$C = \frac{G}{M} \times 10^3 + 191 \theta = 66 \sim 80$$

For confirming advantageous functions of the present invention, a test has been carried out using tires embodying the present invention as well as comparative tires, to evaluate the durability of the bead portion. More particularly, these test tires have been prepared to have the basic structure as shown in FIG. 1, with constant dimensions of H=376 mm, M=210 mm, $h_1$=215 mm, $h_2$=65 mm and W=107 mm, and with the coefficient C and the distance G between the center lines of the carcass body and the turn-up portion, both varied for each tire. The test tires have been subjected to drum running test under the normal inflated condition, with a load 1.9 times higher than predetermined normal load, at a speed of 20 km/H, and over the distance of 4320 km. Subsequently, for each test tire, the length of rubber crack near the carcass turn-up end and radially outer end of the chafer has been measured. Particulars of the test tires and the result of the measurement are shown in the following table, in which the length of the crack is represented by indices with that of the comparative tire A assumed to be 100, under the premise that a smaller index corresponds to more improved durability.

|  | Comparative Tire A | Comparative Tire B | Tire of the Invention C | Tire of the Invention D |
| --- | --- | --- | --- | --- |
| Distance G between center lines of carcass body and turn-up portion (mm) |  |  |  |  |
| 0.26 H | 16.0 | 6.7 | 10.1 | 10.0 |
| 0.40 H | 14.3 | 5.3 | 8.2 | 7.1 |
| Coefficient C | 101~109 | 58~64 | 72~81 | 66~80 |
| Region with reference to line $L_1$, in which distance G has been determined (mm) | 98~150 | 98~150 | 98~150 | 98~150 |
| Length of crack at radially outer end of chafer (index) | 100 | 115 | 46 | 49 |
| Length of crack at carcass turn-up end (index) | 100 | 91 | 31 | 25 |

From the result of measurements shown in the above table, it is evident that the present invention achieves a remarkable improvement in the durability of the bead portion, without requiring a physical increase in the number of chafers or modification in materials, by optimizing the distance G between the center lines of the carcass body and the turn-up portion of the tire. Thus, it now becomes possible to realize an improved radial tire suitable for heavy duty purpose and for rough road use.

What is claimed is:

1. A heavy duty pneumatic radial tire for use on rough roads, comprising:
    a carcass of at least one ply consisting of steel cord layers, which includes a carcass body arranged and extending between both bead portions of the tire, and a pair of turn-up portions contiguous with said carcass body and extending about bead wires embedded in respective bead portions, with distal ends of the turn-up portions extending radially outwardly of the bead wires; and
    at least one pair of chafers consisting of steel cord layers arranged in the bead portions on axially outer side of said carcass turn-up portions;
    said carcass being so arranged as to satisfy, in normal inflated and unloaded condition of the tire, the relationship $h_1 > 0.4H$ wherein
    $h_1$ is a radial distance between each distal end of said carcass turn-up portion and a first line $L_1$ which extends in parallel with the rotational axis of the tire and intersects the center line of said bead wire, and
    H is a radial distance between a first point $P_1$ on said carcass body, which is intersected by said first line $L_1$, and a second point $P_2$ on said carcass body, which is intersected by a second line $L_2$ that extends radially and perpendicularly to said first line $L_1$ and passes said first point $P_1$;
    said carcass body and said turn-up portion having respective center lines defining a distance G therebetween which, in a radially outer region within the range of $(0.26 \sim 0.40)H$ with respect to said first line $L_1$, satisfies the relationship $G = M \times 10^{-3} \times (C - 191\theta)$ wherein
    M is the radial distance between the maximum width point B of said carcass body and said first line $L_1$,
    C is a coefficient within a range of 63.0 to 84.0, and
    $\theta$ is an angle in terms of radian defined by $$\theta = \tan^{-1}\frac{M}{W} - \tan^{-1}\frac{1}{\sqrt{\frac{3.03(W^2 + M^2)}{(2M - 0.243H)^2} - 1}}$$

wherein W is the axial distance between said maximum width point B of said carcass body and said second line $L_2$.

2. The pneumatic radial tire as claimed in claim 1, wherein each chafer has a radially outer end spaced a radial distance $h_2$ from said first line $L_1$, said radial distance $h_2$, with reference to said distance H between said first and second points $P_1$ and $P_2$, and in the normal inflated condition of said tire, satisfying the relationship $h_2 < 0.24H$.

3. The pneumatic radial tire as claimed in claim 1, comprising said carcass of a single ply.

4. The pneumatic radial tire as claimed in claim 1, comprising a single pair of said chafers each including steel cord layers.

* * * * *